United States Patent
Kang et al.

(10) Patent No.: US 12,476,665 B2
(45) Date of Patent: Nov. 18, 2025

(54) WIRELESS COMMUNICATION DEVICE FOR VEHICLE

(71) Applicant: LG ELECTRONICS INC., Seoul (KR)

(72) Inventors: Byungjin Kang, Seoul (KR); Junghyen Ha, Seoul (KR); Cheolseung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 359 days.

(21) Appl. No.: 17/908,861

(22) PCT Filed: Mar. 2, 2020

(86) PCT No.: PCT/KR2020/002949
§ 371 (c)(1),
(2) Date: Sep. 1, 2022

(87) PCT Pub. No.: WO2021/177475
PCT Pub. Date: Sep. 10, 2021

(65) Prior Publication Data
US 2023/0092976 A1    Mar. 23, 2023

(51) Int. Cl.
*H04B 1/44* (2006.01)
(52) U.S. Cl.
CPC ...................... *H04B 1/44* (2013.01)
(58) Field of Classification Search
CPC .......... H04B 1/44; H04B 1/48; H04B 1/3822; H04B 1/401
See application file for complete search history.

(56) References Cited

U.S. PATENT DOCUMENTS

| | | | |
|---|---|---|---|
| 2013/0190005 A1* | 7/2013 | Shrivastava | H04W 4/21 455/456.1 |
| 2016/0118944 A1 | 4/2016 | Datta et al. | |
| 2018/0226367 A1* | 8/2018 | Babcock | H03F 1/347 |

FOREIGN PATENT DOCUMENTS

| | | | | |
|---|---|---|---|---|
| EP | 2621225 A1 * | 7/2013 | ........ | H04W 36/0083 |
| KR | 20160014191 | 2/2016 | | |
| KR | 20180078169 | 7/2018 | | |
| KR | 20190032607 | 3/2019 | | |
| KR | 20190110006 | 9/2019 | | |

OTHER PUBLICATIONS

PCT International Application No. PCT/KR2020/002949, Written Opinion of the International Search Report dated Nov. 13, 2020, 5 pages.

* cited by examiner

*Primary Examiner* — Patrick C Chen
(74) *Attorney, Agent, or Firm* — LEE, HONG, DEGERMAN, KANG & WAIMEY

(57) ABSTRACT

A wireless communication device for a vehicle comprises an antenna, a transceiver for processing a radio frequency (RF) signal, and an RF module placed between the antenna and the transceiver. The RF module comprises an attenuator and an antenna switch connected to the antenna. The antenna switch comprises a bypass path connected to the attenuator and providing a minimum power output when power is set to a minimum value.

8 Claims, 10 Drawing Sheets

WIRELESS COMMUNICATION DEVICE FOR VEHICLE

CROSS-REFERENCE TO RELATED APPLICATIONS

This application is the National Stage filing under 35 U.S.C. 371 of International Application No. PCT/KR2020/002949, filed on Mar. 2, 2020, the contents of which are all incorporated by reference herein in their entirety.

BACKGROUND OF THE DISCLOSURE

Field

The present disclosure relates to a wireless communication device for a vehicle, and more particularly, to a wireless communication device for a vehicle to satisfy a minimum output power.

Related Art

A vehicle is an apparatus which moves a passenger from one place to another place. A representative example is a car. A vehicle-to-everything (V2X) communication technology, which means vehicle-to-object communication, refers to a technology in which the vehicle communicates with other vehicles, pedestrians, road infrastructures, servers, and the like to provide a series of services.

For the V2X, standardization organizations such as Institute of Electrical and Electronics Engineers (IEEE), 3rd Generation Partnership Project (3GPP), etc. provide various communication specifications. Dedicated Short Range Communications (DSRC) is a communication standard protocol based on IEEE 802.11. The Long Term Evolution (LTE) and New Radio (NR) of the 3GPP also provide the communication protocol for the V2X.

In addition to the V2X, partially or fully autonomous vehicles are emerging. This autonomous vehicle needs to exchange more data with neighbor vehicles, pedestrians, servers, and the like with low latency and high reliability.

A cellular-V2X (C-V2X) is a technology that provides V2X based on 3GPP cellular communication. The C-V2X must comply with 3GPP technical specification (TS) regulations. Section 6.3.2 of 3GPP TS 36.521-1 V15.5.0 (2019 March) specifies the minimum output power of a wireless device. According to this, when the power is set to the minimum value, the minimum output power is set to −40 dBm or less. The minimum output power is a value defining a power level while the transmitter does not output a signal and should be less than the reference value.

SUMMARY OF THE DISCLOSURE

The present disclosure provides a radio frequency (RF) module to satisfy a minimum output power and a wireless communication device using the same.

In an aspect, a wireless communication device for a vehicle comprises an antenna, a transceiver configured to process a transmit (TX) radio frequency (RF) signal and a receive (RX) RF signal, and an RF module disposed between the antenna and the transceiver. The RF module comprises an attenuator and an antenna switch connected to the antenna. The antenna switch comprises a first throw coupled to the attenuator and configured to provide a bypass path that provides a minimum output power when the power is set to a minimum value, a second throw configured to provide a TX path for sending the TX RF signal output by the transceiver to the antenna, and a third throw providing an RX path for sending the RX RF signal received by the antenna to the transceiver In another aspect, a radio frequency (RF) module comprises an attenuator, and an antenna switch connected to the antenna. The antenna switch comprises a first throw coupled to the attenuator and configured to provide a bypass path that provides a minimum output power when the power is set to a minimum value, a second throw configured to provide a TX path for sending the TX RF signal output by the transceiver to the antenna, and a third throw providing an RX path for sending the RX RF signal received by the antenna to the transceiver It is possible to provide a wireless communication device for a vehicle that satisfies the minimum output power specified by 3GPP without increasing circuit complexity.

DETAILED DESCRIPTION OF THE EMBODIMENTS

Figure 1:
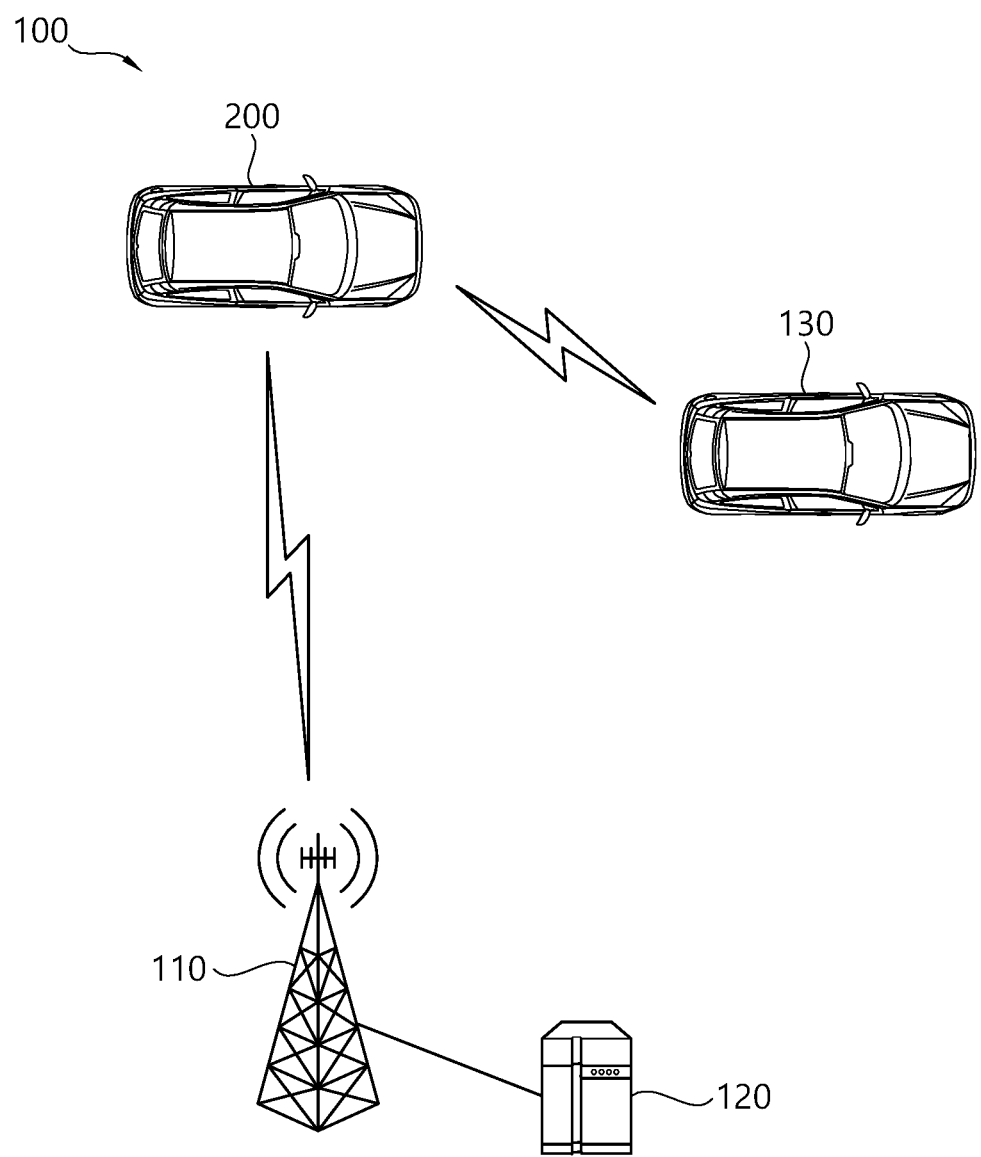
FIG. 1 illustrates a system to which an embodiment is applied.

Hereinafter, embodiments disclosed in the present disclosure will be described in detail with reference to the accompanying drawings, and the same or like components are denoted by the same reference numerals regardless of the reference numerals, and redundant description thereof will be omitted. The suffixes "module" and "unit" for the components used in the following description are given or mixed in consideration of ease of writing the disclosure, and do not have distinct meanings or roles in itself. In addition, in the description of the embodiments disclosed in the present disclosure, if it is determined that the detailed description of the related known technology may obscure the subject matter of the embodiments disclosed in the present disclosure, the detailed description thereof will be omitted. In addition, the accompanying drawings are intended merely for facilitating understanding of the embodiments disclosed in the present disclosure, and the technical subject matters disclosed in the present disclosure is not limited by the accompanying drawings.

Terms including ordinal numbers such as first and second may be used to describe various components, but the components are not limited by the terms. The terms are used only for the purpose of distinguishing one component from another component.

When a component is said to be "connected" or "coupled" to another component, it may be directly connected to or coupled to another component, but it should be understood that other components may exist therebetween. On the other hand, when a component is said to be "directly connected" or "directly coupled" to another component, it should be understood that there exist no other components therebetween.

Singular expressions include plural expressions unless the context clearly indicates otherwise.

In the present application, it should be understood that the term "comprises", "having", or the like is intended to indicate that there exists a feature, a number, a step, an operation, a component, a part, or combination thereof described in the disclosure, and does not exclude the possibility of the presence or the addition of one or more other features, numbers, steps, operations, components, parts, or a combination thereof in advance.

In the following description, the left of the vehicle means the left of the forward driving direction of the vehicle, and the right of the vehicle means the right of the forward driving direction of the vehicle.

FIG. 1 illustrates a system to which an embodiment is applied.

A system 100 includes a vehicle 200, a base station 110, and a server 120. The vehicle 200 may communicate with the base station 110 and/or a surrounding vehicle 130 by using a wireless communication protocol. The wireless communication protocol has no limitations, and may include, for example, Dedicated Short Range Communications (DSRC) or WiFi based on the Institute of Electrical and Electronics Engineers (IEEE) 802.11, and/or cellular communications based on the 3rd Generation Partnership Project (3GPP) (for example, Wideband Code Division Multiple Access (WCDMA), Long Term Evolution (LTE), New Radio (NR), and the like).

The base station 110 may communicate with the vehicle 200 or other base stations by using various wireless communication protocols such as DSRC, LTE, NR, and WiFi.

The server 120 includes computing hardware which is connected to one or more base stations 110 to provide autonomous driving data services to the vehicle 200. For example, the computing hardware may include a processor and a memory. The memory may store map data and driving environment information which are described in the following embodiments, and the processor may provide this data to the vehicle 200. The processor may update the map data based on the data which is received from the one or more vehicles 200.

The vehicle 200 may include various types of automobiles, trucks, airplanes, boats, and the like for transporting people or objects. The vehicle 200 may use an internal combustion engine and/or an electric motor as a power source. The vehicle 200 may be configured to operate autonomously. The autonomous driving refers to, for example, driving without the assistance of a human driver. In the autonomous driving mode, the vehicle 200 may be configured to detect the neighbor vehicle 130 and determine the trajectory of the detected vehicle. The vehicle 200 may exchange information by communicating with the neighbor vehicle 130. The vehicle 200 may switch between the autonomous driving mode and the manual driving mode. Even in the manual driving mode, the vehicle 200 may provide useful route information to the driver, or support various Advanced Driver Assistance Systems (ADAS).

Figure 2:
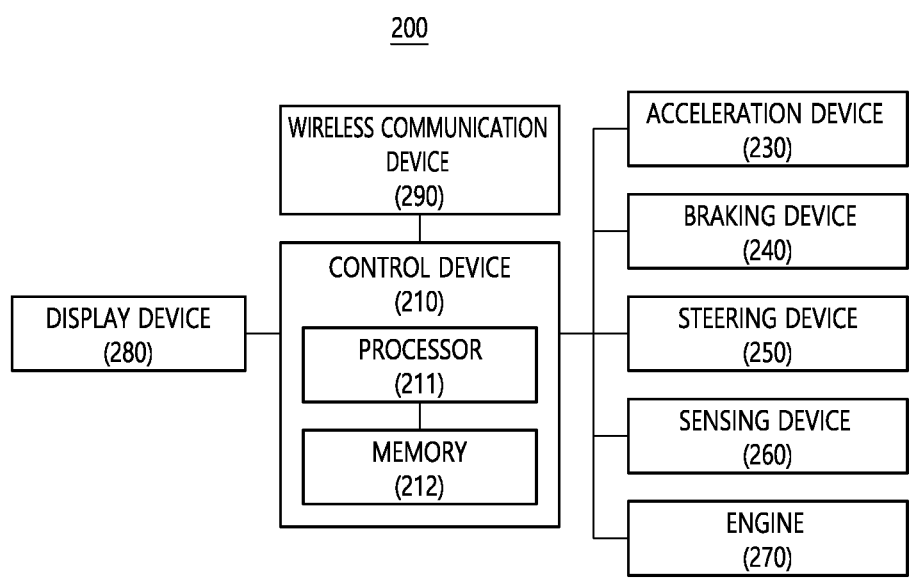
FIG. 2 is a block diagram illustrating a vehicle implementing the present embodiment.

FIG. 2 is a block diagram illustrating a vehicle implementing the present embodiment.

The vehicle 200 may include a control device 210, an acceleration device 230, a braking device 240, a steering device 250, a sensing device 260, and an engine 270. The devices presented are only illustrative, and not all devices are essential. The vehicle 200 may further include additional devices, or specific devices may be omitted. Some of the devices may have their own processors, and perform processing related to the specific function of that device.

The acceleration device 230 may be a mechanism which is configured to accelerate the vehicle 200. The braking device 240 may be a mechanism which is configured to decelerate the vehicle 200. The steering device 250 may be a mechanism which is configured to adjust the direction of the vehicle 200. The vehicle 200 may accelerate through the acceleration device 230, decelerate through the braking device 240, and change a driving direction through the steering device 250. At least any one of the acceleration device 230, the braking device 240, and the steering device 250 may be controlled by the control device 210 and/or an additional controller in order to control the speed and direction of the vehicle 200.

The sensing device 260 may include one or more sensors configured to sense information regarding the location/speed of the vehicle 200 and/or the environment of the vehicle 200. The sensing device 260 may include a location sensor which measures a geographical location of the vehicle 200 and an object detection sensor which recognizes an object around the vehicle 200. The location sensor may include a Global Positioning System (GPS) receiver. The location sensor may further include an accelerometer, a gyroscope, and the like configured to determine the direction and speed of the vehicle 200, and their changes. The object detection sensor may include at least any one of a camera, a radar, an ultrasonic sensor, and an infrared sensor.

The sensing device 260 may include a state sensor which is set to sense a state of the vehicle 200. The state sensor may include at least any one of an inertial navigation unit (IMU) sensor, a collision sensor, a wheel sensor, a speed sensor, a tilt sensor, a weight sensing sensors, a heading sensor, a position module, a vehicle forward/backward sensor, a battery sensor, a fuel sensor, a tire sensor, a steering sensor by handle rotation, a vehicle interior temperature sensor, a vehicle interior humidity sensor, an ultrasonic sensor, an illumination sensor, an accelerator pedal position sensor, and a brake pedal position sensor. The sensing device 260 may acquire sensing signals for vehicle posture information, vehicle motion information, vehicle yaw information, vehicle roll information, vehicle pitch information, vehicle collision information, vehicle direction information, vehicle angle information, vehicle speed information, vehicle acceleration information, vehicle tilt information, vehicle forward/backward information, battery information, fuel information, tire information, vehicle lamp information, vehicle interior temperature information, vehicle interior humidity information, steering wheel rotation angle, vehicle exterior illumination, a pressure applied to the accelerator pedal, a pressure applied to the brake pedal, and the like.

The control device 210 may exchange various information by communicating with the acceleration device 230, the braking device 240, the steering device 250, and the sensing device 260, or control these devices.

The control device 210 may include a processor 211 and a memory 212. The control device 210 may include one or more sub-devices based on the function, and each sub-device may include at least one of the processor and the memory, and may be configured to perform processing related to the function of the corresponding sub-device. For example, the control device 210 may include a telematics control unit (TCU) which is responsible for communication between the interior and the exterior of the vehicle 200. The control device 210 may include an autonomous driving device which is responsible for autonomous driving. The control device 210 may include an infotainment system or an Audio Video Navigation (AVN) system which displays driving information to passengers or provides various entertainments. According to the following embodiments, the control device 210 may include the TCU or the infotainment system. Alternatively, the control device 210 may also include a combination of the TCU and the infotainment system or a combination of other functions.

The processor 211 may include an application-specific integrated circuit (ASIC), a central processing unit (CPU), an application processor (AP), digital signal processors (DSPs), a microcontroller, a chipset, a logic circuit, a data processing device, and/or a combination thereof. In the software implementation for the following embodiments, a software code which performs the functions described herein may be stored in the memory 212 and processed by the processor 211.

The memory 212 may store information which is accessible by the processor 211. The information may include instructions which are executable by the processor 211 and/or data which are processed by the processor. The memory 212 may include any form of computer-readable medium which operates to store information. For example, the memory 212 may include a read only memory (ROM), a random access memory (RAM), a digital video disc (DVD), an optical disc, a flash memory, a Solid State Drive (SSD), a hard drive, and a combination thereof.

Although the control device 210 is described to include the processor and the memory in one physical block, the control device 210 may include a plurality of processors and a plurality of memories, and may be physically or logically, operatively connected.

The control device 210 may be connected to a display device 280 configured to display information. The display device 280 may include a liquid crystal display (LCD) touch screen or an Organic Light Emitting Diode (OLED) touch screen, and include various sensors (a video camera, a microphone, and the like) configured to detect a passenger's state or gesture.

The control device 210 may be connected to a wireless communication device 290 which is set to communicate with other devices. The control device 210 may exchange a wireless signal with mobile devices of the interior/exterior of the vehicle 200 or a server 120 (see FIG. 1) or the surrounding vehicle through the wireless communication device 290. There are no limitations to the wireless communication protocol which is supported by the wireless communication device 290, and the wireless communication device 290 may support various wireless communication protocols such as cellular communication, WiFi, BLUETOOTH, ZIGBEE, an infrared link, and the like.

The memory 212 of the control device 210 may have map information and/or driving plan data. The driving plan data may include information on a vehicle trajectory for the vehicle 200 to track the location of the vehicle from the current location to the destination. The driving plan data may be used to guide the trajectory to the driver, or for autonomous driving. The map information may include various maps configured to define the driving environment. The map information may include the shape and elevation of a roadway, a lane line, an intersection, a crosswalk, a speed limit, a traffic signal, buildings, or other objects or information. The map information may further include real-time traffic information, obstructions on the roadway, roadway state information, and the like. The map information and the driving plan data may be updated based on the information which is given by the server 120, or updated based on the information which is detected by the sensing device 260 of the vehicle 200.

The engine 270 provides propulsion to the vehicle 200. The engine 270 may include an internal combustion engine, an electric motor, or a combination thereof.

A wireless communication device may support a cellular communication such as LTE/LTE-Advanced (LTE-A)/New Radio (NR) provided by the 3rd Generation Partnership Project (3GPP) standardization organization for cellular vehicle-to-everything (C-V2X). The device for satisfying the minimum output power specified by 3GPP are proposed as follows.

Figure 3:
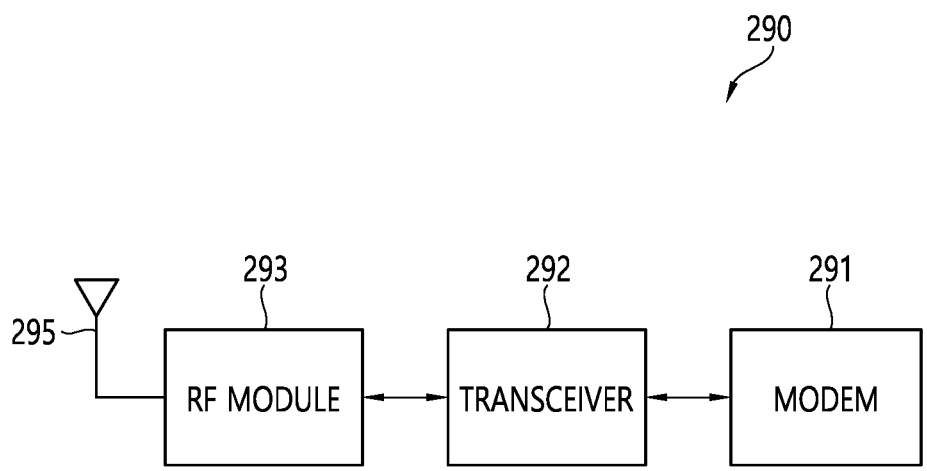
FIG. 3 is a block diagram illustrating a wireless communication device according to an embodiment of the present specification.

FIG. 3 is a block diagram illustrating a wireless communication device according to an embodiment of the present specification.

A wireless communication device 290 includes a modem 291, a transceiver 292, an RF module 293, and one or more antennas 295. The modem 291 receives input data from the control device 210 and converts the input data into a signal that can be processed by the transceiver 292. The modem 291 receives a signal from the transceiver 292 and outputs output data that can be processed by the control device 210. The transceiver 292 converts the signal received from the modem 291 into a radio frequency (RF) signal through an internal mixer and outputs the RF signal to the RF module 293, or processes the RF signal received from the RF module 293 and output the received RF signal to the modem 292. The RF module 293 processes signals transmitted and/or received through the one or more antennas 295.

Figure 4:
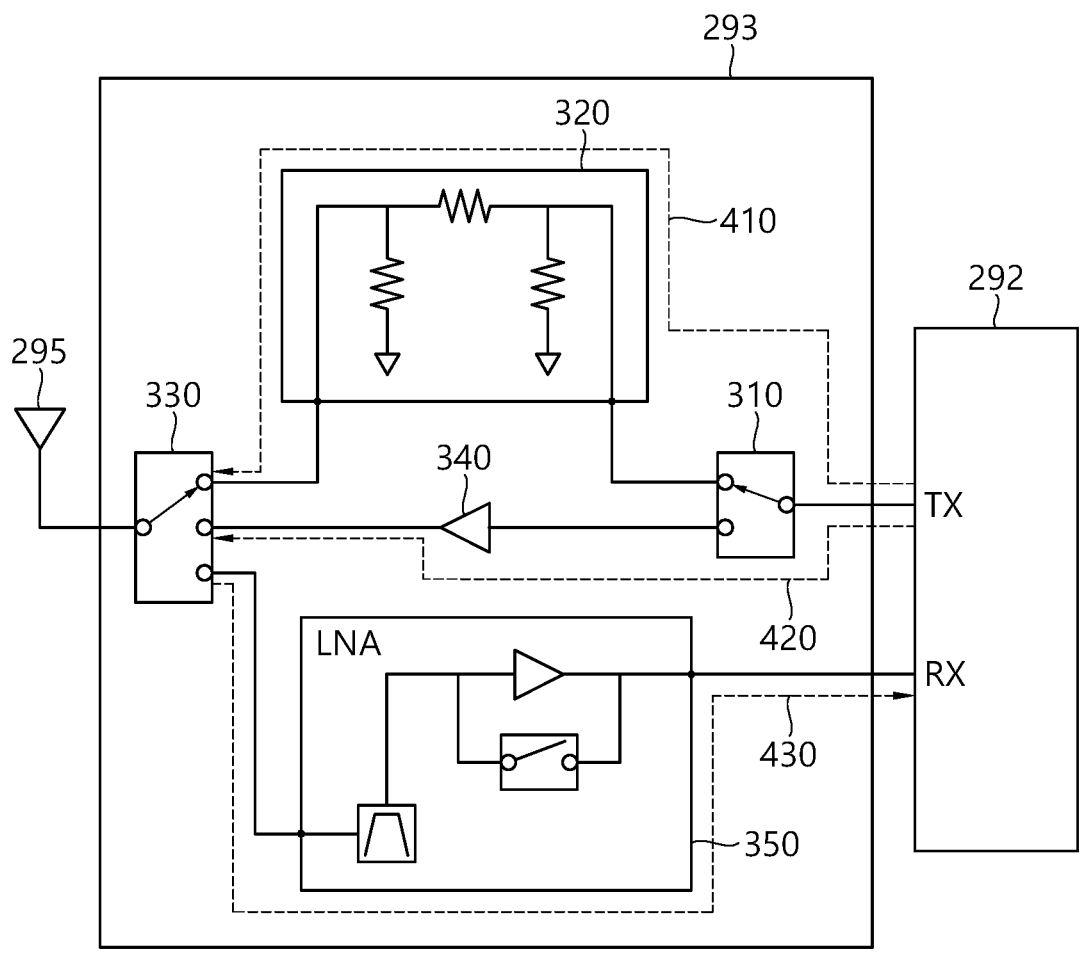
FIG. 4 is a block diagram illustrating an RF module according to an embodiment of the present specification.

FIG. 4 is a block diagram illustrating an RF module according to an embodiment of the present specification.

An RF module 293 includes a transmit (TX) switch 410, an attenuator 320, an antenna switch 330, a TX amplifier 340 and a receive (RX) amplifier 350. The RF module 293 provides a bypass path 410, a TX path 420 and an RX path 430.

The TX path 420 is a path through which the TX RF signal received from the transceiver 292 passes. The TX RF signal is output to the antenna 295 through the TX amplifier 340.

The RX path 430 is a path through which a signal received from the antenna 295 passes. The received signal is input to the transceiver 292 through the RX amplifier 350. The RX amplifier 350 may include a low-noise amplifier (LNA).

The bypass path 410 is a path that provides the minimum output power when the power is set to the minimum value. An attenuator 320 for satisfying the minimum output power is disposed on the bypass path 410. The minimum output power may satisfy the reference value of −40 dBm or less. The reference value is merely an example, and there is no limitation thereto. The power being set to the minimum value may mean that the RF module 293 is not attempting to output any signal or that the RF module 293 is not receiving any signal from the transceiver 292. Setting the power to the minimum value may mean that the wireless communication device operates in a low power mode.

The TX switch 310 routes the TX RF signal received from the transceiver 292 to the TX path 420 or the bypass path 410. The TX switch 310 may have a single-pole double-throw (SP2T) configuration. A single pole of TX switch 310 is coupled to the TX output of transceiver 292. A first throw of the TX switch 310 may be connected to the attenuator 320 on the bypass path 410. A second throw of TX switch 310 may be coupled to TX amplifier 340 on TX path 420.

The antenna switch 330 couples antenna 295 with one of bypass path 410, TX path 420, and RX path 430. The antenna switch 330 may have a single-pole triple-throw (SP3T) configuration. A single pole of the antenna switch 330 is connected to the antenna 295. The first throw of the antenna switch 330 may be connected to the attenuator 320 on the bypass path 410. A second throw of the antenna switch 330 may be coupled to a TX amplifier 340 on the TX path 420. A third throw of the antenna switch 330 may be coupled to the RX amplifier 350 on the RX path 430.

The TX RF signal output from the transceiver 292 is guided to the TX path 420 by the TX switch 310 and the antenna switch 330. If no signal is transmitted, it is guided to the bypass path 410 by the TX switch 310 and the antenna switch 330. The received signal received from the antenna 295 is guided to the RX path 430 by the antenna switch 330.

According to the proposed RF module, since only two switches are used, switching latency can be improved by reducing the number of switches through which a signal passes. The attenuator can keep the minimum output power below the reference value while operating in low power mode. By minimizing the number of switches, it is possible to reduce manufacturing cost and circuit complexity. Since the RX path uses only one switch, it is possible to minimize the effect on RX sensitivity. By embedding the switch into the RF module, small loss can be achieved compared to the switch located outside, so power consumption can be reduced. It can be suitable for V2X applications where reducing battery power consumption is effective.

In some embodiments, the various elements on the RF module may be implemented as semiconductor dies. The semiconductor die may be packaged in a wirebond type, a flip-chip type, or a combination thereof.

Figure 5:
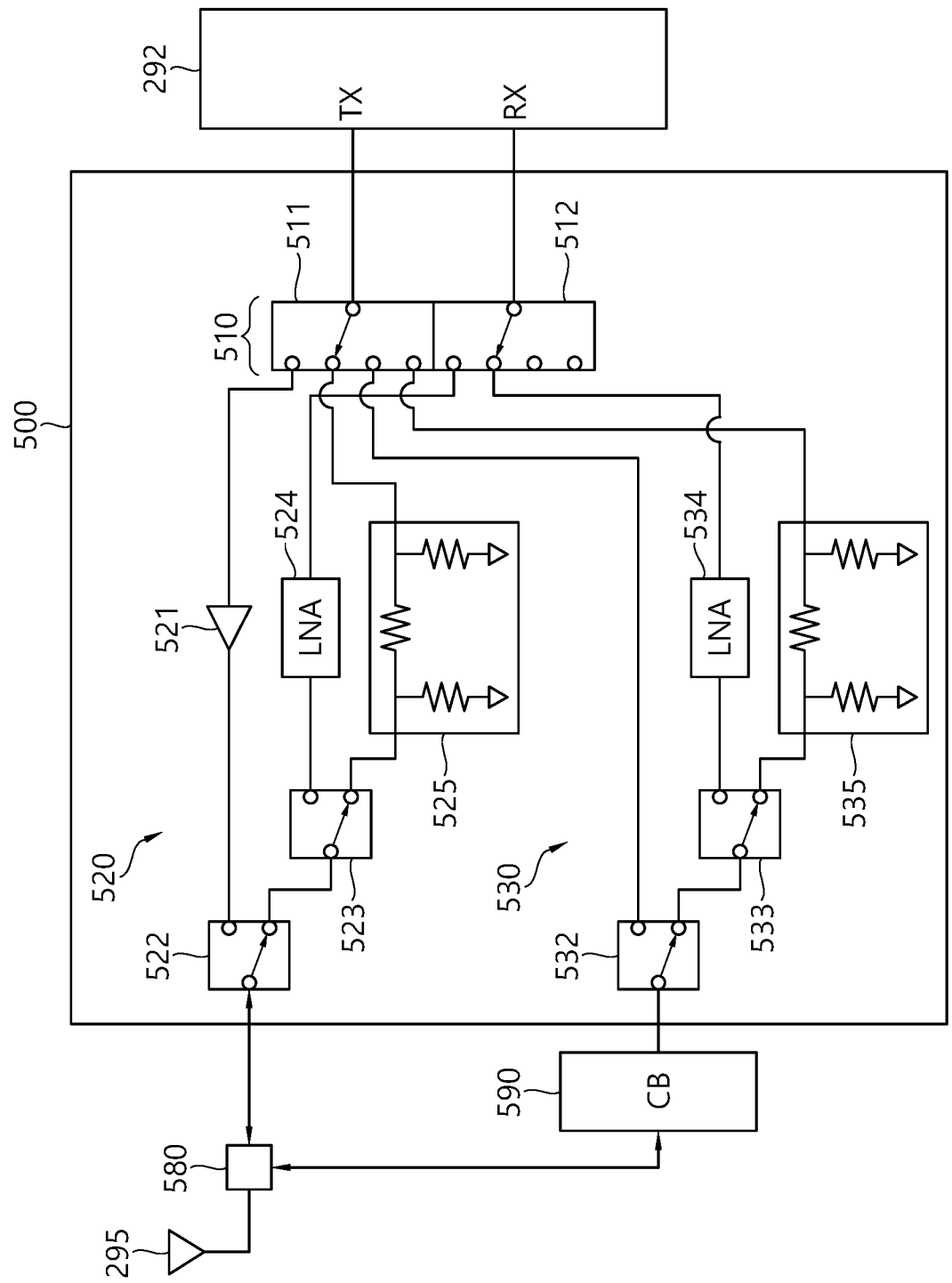
FIG. 5 is a block diagram illustrating an RF module according to another embodiment of the present specification.

FIG. 5 is a block diagram illustrating an RF module according to another embodiment of the present specification.

An RF module 500 and an antenna 295 are connected using a cable. However, in the case of a vehicle, the distance between the control device having the RF module 500 and the antenna 295 may be very long. This is because the control device is mounted inside the vehicle, and the antenna 295 is mounted on the chassis of the vehicle. A compensator block circuit (CB) 590 may be added to compensate signal attenuation due to long cables. The signal sent to the antenna 295 and the signal received from the antenna 295 are routed to and from the RF module 500 through the CB 590 by a branch circuit 580, or can be transmitted directly to the RF module 500 without CB 590

Although it is shown that the branch circuit 580 and the CB 590 are disposed separately from the RF module 500, the RF module 500 may include at least one of the branch circuit 580 and the CB 590.

The RF module 500 includes a main switch 510, a first part 520, and a second part 530. The first part 520 processes signals transmitted/received directly to/from the antenna 295 without the CB 590. The second part 530 is connected to the CB 590 to process signals transmitted/received to/from the antenna 295 via the CB 590. Compared to the first part 520, the second part 530 does not include a TX amplifier. This is because the CB 590 amplifies the TX signal.

The main switch 510 may include a TX switch 511 and an RX switch 512. When the main switch 510 has a dual single-pole quadruple-throw (SP4T), the first SP4T may be used as the TX switch 511, and the second SP4T may be used as the RX switch 512. The RX switch 512 may have a single-pole double-throw (SP2T) instead of SP4T according to a circuit configuration.

The TX switch 511 transmits a TX RF signal received from the output port of the transceiver 292 to the TX path of the first part 520 or the TX path of the second part 530. In the low power mode, the TX switch 511 transmits the signal to the bypass path of the first part 520 or the bypass path of the second part 530.

The RX switch 512 sends a signal received through the RX path of the first part 520 or the RX path of the second part 530 to an input port of the transceiver 292.

The first part 520 includes a TX amplifier 521, a first switch 522, a second switch 523, an RX amplifier 524 and an attenuator 525. A TX path is formed through the TX amplifier 521 and the first switch 522. An RX path is formed through a first switch 522, a second switch 523 and an RX amplifier 524. A bypass path is formed through the first switch 522, the second switch 523, and the attenuator 525.

The second part 530 includes a first switch 532, a second switch 533, an RX amplifier 534 and an attenuator 535. A TX path is formed through a first switch 532. An RX path is formed through a first switch 532, a second switch 533, and an RX amplifier 534. A bypass path is formed through the first switch 532, the second switch 533, and the attenuator 535.

While CB operates, the minimum output power can be satisfied. By minimizing the number of switches, RX/TX sensitivity can be improved and circuit complexity can be reduced.

Figure 6:
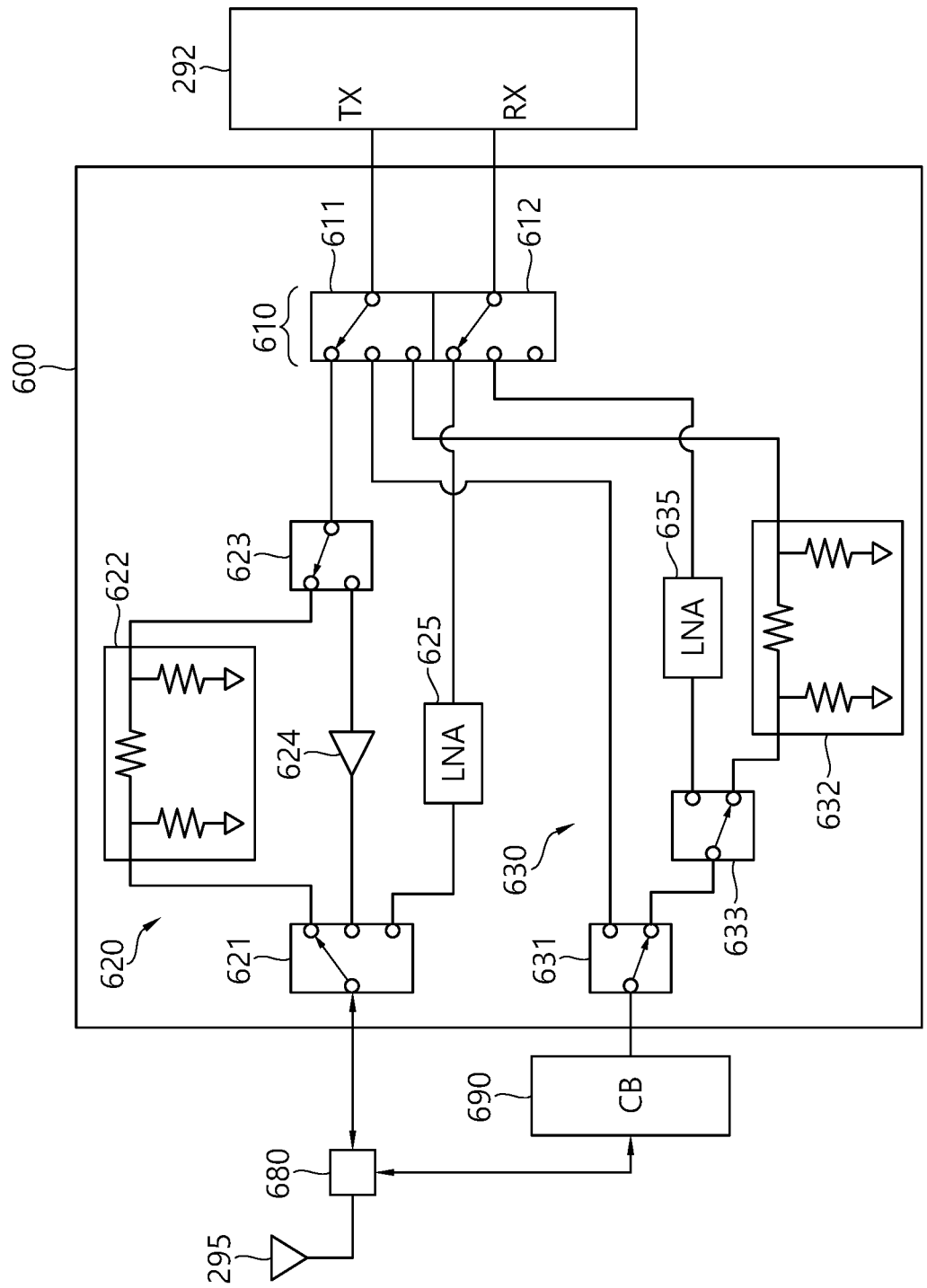
FIG. 6 is a block diagram illustrating an RF module according to still another embodiment of the present specification.

FIG. 6 is a block diagram illustrating an RF module according to still another embodiment of the present specification. A branch circuit 680 and a CB 690 are disposed between the RF module 600 and the antenna 295.

The RF module 600 includes a main switch 610, a first part 620, and a second part 630. The first part 620 processes signals transmitted/received directly to/from the antenna 295 without the CB 690. The second part 630 is connected to the CB 690 to process signals transmitted/received to/from the antenna 295 via the CB 690.

The main switch 610 may include a TX switch 611 and an RX switch 612. If the main switch 610 has a dual SP3T, the first SP3T may be used as the TX switch 611, and the second SP3T may be used as the RX switch 612. The RX switch 512 may have a single-pole double-throw (SP2T) instead of SP4T according to a circuit configuration.

The TX switch 611 transmits the TX RF signal received from the output port of the transceiver 292 to the TX path of the first part 620 or the TX path of the second part 630. In the low power mode, the TX switch 611 sends the signal to the bypass path of the first part 620 or the bypass path of the second part 630.

The RX switch 612 sends a signal received through the RX path of the first part 620 or the RX path of the second part 630 to an input port of the transceiver 292.

The first part 620 includes a first switch 621, an attenuator 622, a second switch 623, a TX amplifier 624, and an RX amplifier 625. The TX path is formed through the second switch 623, the TX amplifier 624 and the first switch 621.

The RX path is formed through the first switch 621 and the RX amplifier 625. The bypass path is separated from the TX path by a second switch 623. A bypass path is formed through the second switch 623, the attenuator 622, and the first switch 621.

The second part 630 includes a first switch 631, an attenuator 632, a second switch 633, and an RX amplifier 635. The TX path is formed through the first switch 631. The RX path is formed through the first switch 631, the second switch 633, and the RX amplifier 635. The bypass path is separated from the RX path by a second switch 633. A bypass path is formed through the first switch 631, the second switch 633, and the attenuator 632.

While CB operates, the minimum output power can be satisfied. By minimizing the number of switches, RX/TX sensitivity can be improved and circuit complexity can be reduced.

Figure 7:
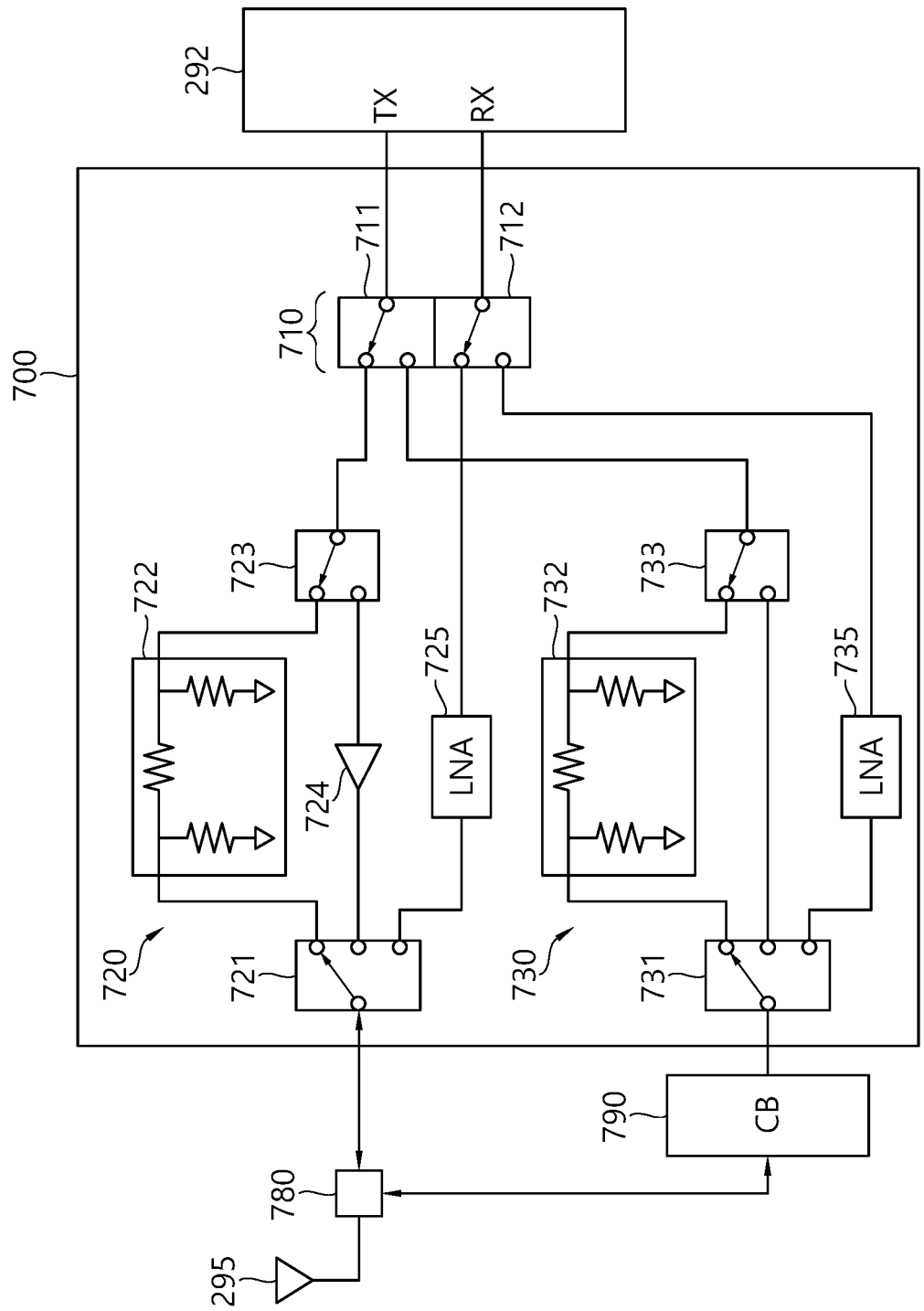
FIG. 7 is a block diagram illustrating an RF module according to still another embodiment of the present specification.

FIG. 7 is a block diagram illustrating an RF module according to still another embodiment of the present specification. A branch circuit 780 and a CB 790 are disposed between the RF module 700 and the antenna 295.

The RF module 700 includes a main switch 710, a first part 720, and a second part 730. The first part 720 processes signals transmitted/received directly to/from the antenna 295 without the CB 790. The second part 730 is coupled to the CB 790 to process signals transmitted/received to/from the antenna 295 via the CB 790.

The main switch 710 may include a TX switch 711 and an RX switch 712. When the main switch 610 has dual SP2T, the first SP2T may be used as the TX switch 711, and the second SP2T may be used as the RX switch 712.

The TX switch 711 sends the TX RF signal received from the output port of the transceiver 292 to the TX path/bypass path of the first part 720 or the TX path/bypass path of the second part 730.

The RX switch 712 sends a signal received through the RX path of the first part 720 or the RX path of the second part 730 to the input port of the transceiver 292.

The first part 720 includes a first switch 721, an attenuator 722, a second switch 723, a TX amplifier 724, and an RX amplifier 725. The TX path is formed through the second switch 723, the TX amplifier 724 and the first switch 721. The RX path is formed through the first switch 721 and the RX amplifier 725. The bypass path is separated from the TX path by a second switch 723. A bypass path is formed through the second switch 723, the attenuator 622, and the first switch 721.

The second part 730 includes a first switch 731, an attenuator 732, a second switch 733, and an RX amplifier 735. The TX path is formed through the first switch 731. The RX path is formed through the first switch 731 and the RX amplifier 735. The bypass path is separated from the TX path by a second switch 733. A bypass path is formed through the first switch 731, the second switch 733, and the attenuator 732.

While CB operates, the minimum output power can be satisfied. By minimizing the number of switches, RX/TX sensitivity can be improved and circuit complexity can be reduced.

Figure 8:
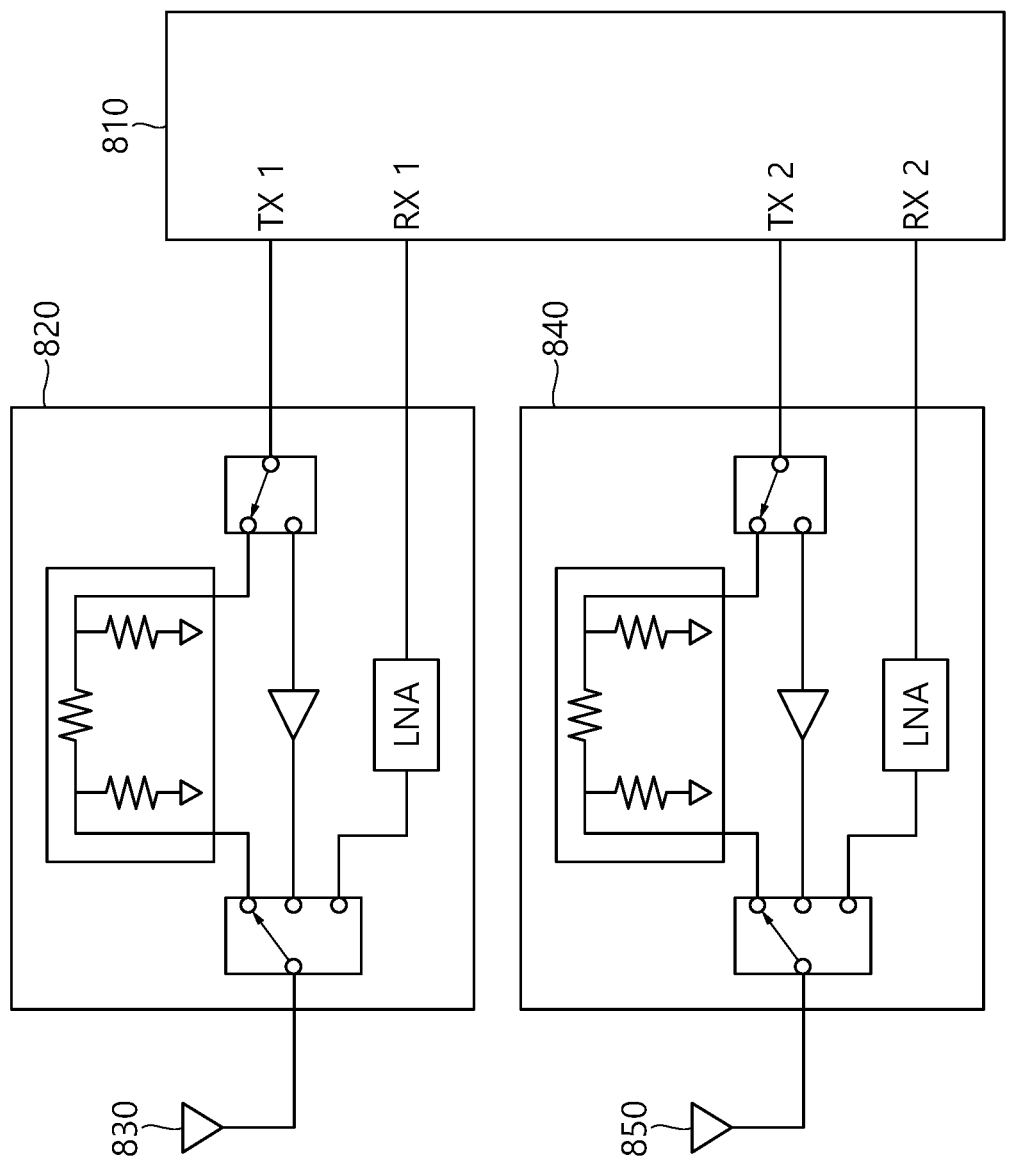
FIG. 8 is a block diagram illustrating an RF module according to still another embodiment of the present specification.

FIG. 8 is a block diagram illustrating an RF module according to still another embodiment of the present specification. This is a case of using multiple antennas. Here, two antennas 830 and 850 are described as an example, but the following embodiment may also be applied to three or more antennas.

A transceiver 810 includes a plurality of output ports TX1 and TX2 and a plurality of input ports RX1 and RX2. The first RF module 820 is disposed between the first antenna 830 and the transceiver 810, and the second RF module 840 is disposed between the second antenna 850 and the transceiver 810. A corresponding RF module may be associated with each antenna. Although the first RF module 820 and the second RF module 840 may be separated, they may be formed as one integrated module.

The structures of the first RF module 820 and the second RF module 840 may be the same as those of the RF module according to the embodiment shown in of FIG. 4. A minimum output power for each antenna may be satisfied in the low power mode.

Figure 9:
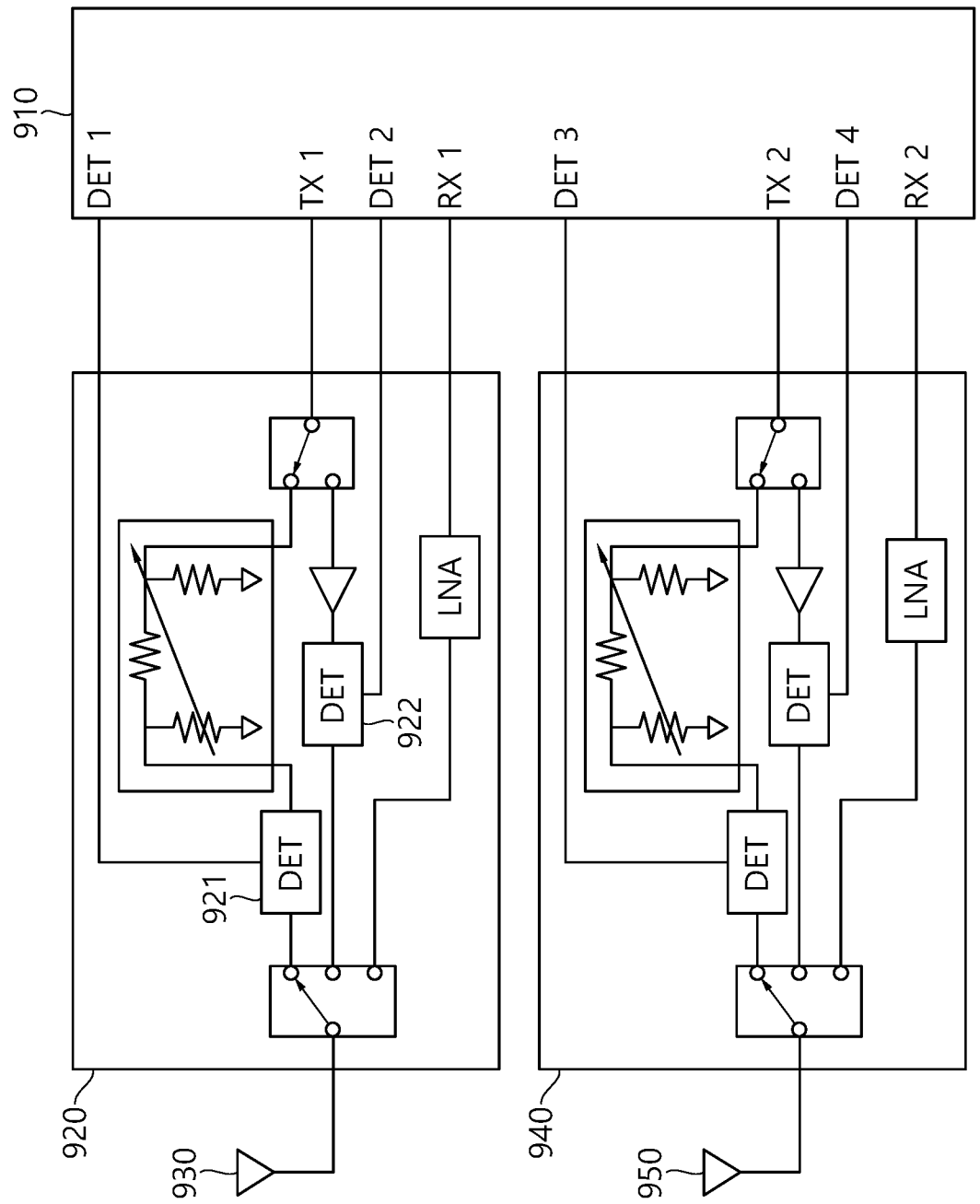
FIG. 9 is a block diagram illustrating an RF module according to still another embodiment of the present specification.

FIG. 9 is a block diagram illustrating an RF module according to still another embodiment of the present specification. The first RF module 920 is disposed between the first antenna 930 and the transceiver 910, and the second RF module 940 is disposed between the second antenna 950 and the transceiver 910.

Compared with the embodiment shown in FIG. 8, a power detector is disposed in at least one of a TX path and a bypass path in each RF module. Here, the first power detector 921 is disposed on the bypass path, and the second power detector 922 is disposed on the TX path. The power level of the attenuator may be monitored through the first power detector 921 and the value of the attenuator may be varied. To vary the value of the attenuator, the attenuator may include a variable resistor. The second power detector 922 may monitor the power level of the TX amplifier and change the value of the TX amplifier.

Figure 10:
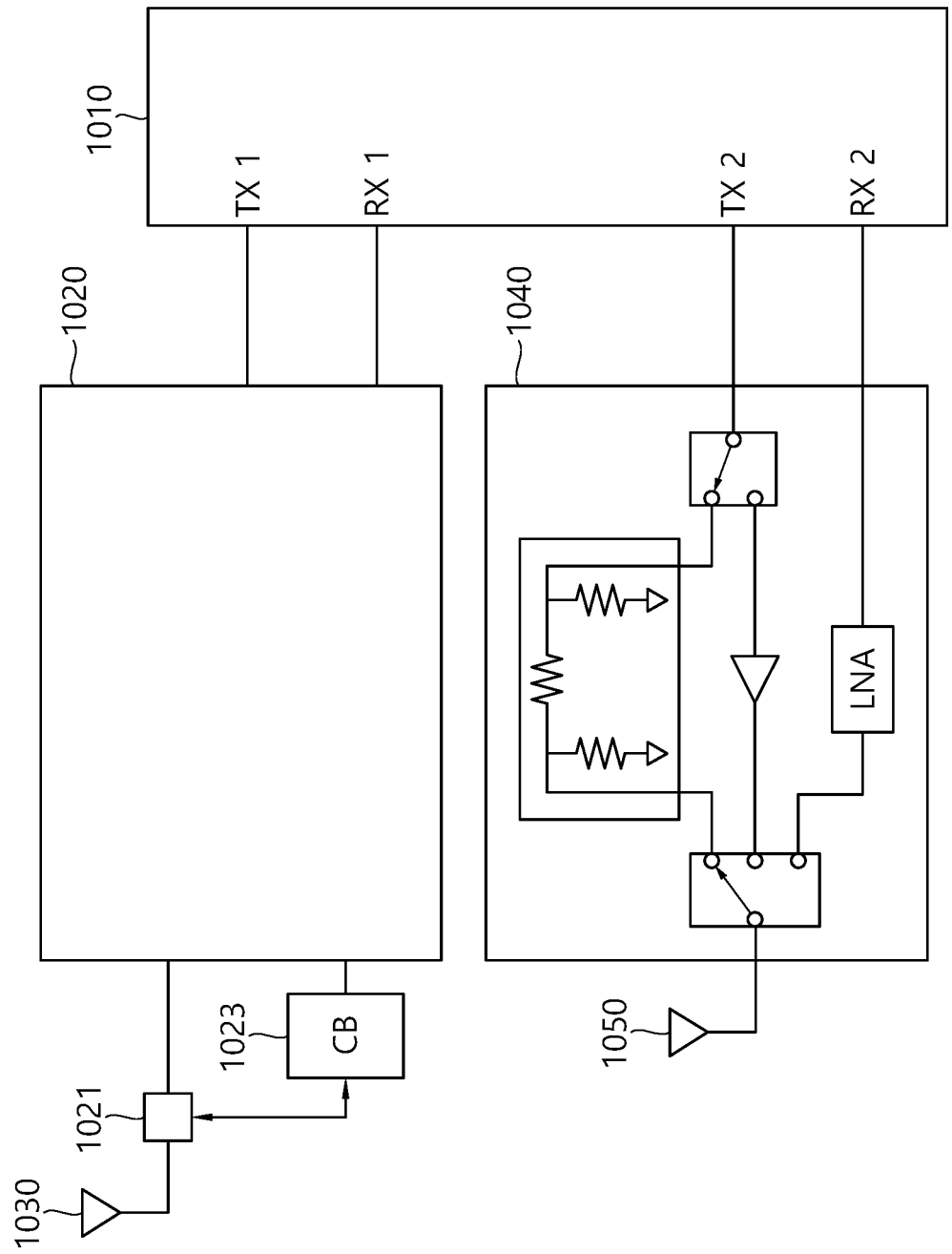
FIG. 10 is a block diagram illustrating an RF module according to still another embodiment of the present specification.

FIG. 10 is a block diagram illustrating an RF module according to still another embodiment of the present specification. This is a case in which a CB is disposed on at least one of a plurality of antennas.

A branch circuit 1021 and a CB 1023 are disposed in the first antenna 1030. The RF module 1020 associated with the first antenna 1030 may be the RF module shown in the embodiment of FIG. 5, 6, or 7.

In the embodiment described above, the RF module may include one or more sub-modules. Each sub-module may include at least one of a switch, an attenuator, a TX amplifier, and an RX amplifier. Each sub-module is functionally connected to each other and may further include additional components. Each sub-module may be implemented by mounting one or more elements on a semiconductor substrate.

What is claimed is:

1. A wireless communication device for a vehicle supporting a cellular vehicle-to-everything (C-V2X) communication comprising:
    an antenna;
    a transceiver configured to transmit a transmit (TX) radio frequency (RF) signal and receive a receive (RX) RF signal;
    a compensator block circuit coupled with the antenna and configured to compensate signal attenuation due to a length of cable in the vehicle; and
    an RF module disposed between the antenna and the transceiver, and configured to transmit the TX RF signal received from the transceiver through the antenna and deliver the RX RF signal received from the antenna to the transceiver,
    wherein the RF module includes a first part and a second part,
        the first part directly coupled with the antenna and configured to directly transmit the TX RF signal received from the transceiver through the antenna and directly receive the RX RF signal from the antenna, the second part coupled with the compensator block circuit and configured to transmit the TX RF signal received from the transceiver through the compensator block circuit and receive the RX RF signal from the compensator block circuit, wherein each of the first part and the second part comprises:

a first throw providing a bypass path while the transceiver does not send any TX RF signal to the RF module or does not receive any RX RF signal from the RF module;

a second throw providing a TX path for sending the TX RF signal output by the transceiver to the antenna; and a third throw providing an RX path for sending the RX RF signal received by the antenna to the transceiver, wherein an attenuator is disposed on the bypass path and configured to satisfy a minimum output power for the C-V2X communication while the transceiver does not send any TX RF signal to the RF module or does not receive any RX RF signal from the RF module, and wherein the minimum output power for the C-V2X communication is −40 dBm or less.

2. The wireless communication device of claim 1, wherein the second throw is coupled to a TX amplifier.

3. The wireless communication device of claim 1, wherein the third throw is coupled to a low-noise amplifier (LNA).

4. The wireless communication device of claim 1, wherein the attenuator includes a variable resistor.

5. A vehicle comprising a wireless communication device supporting a cellular vehicle-to-everything (C-V2X) communication, the wireless communication device comprising:

an antenna;

a transceiver configured to transmit a transmit (TX) radio frequency (RF) signal and receive a receive (RX) RF signal;

a compensator block circuit coupled with the antenna and configured to compensate signal attenuation due to a length of cable in the vehicle; and an RF module disposed between the antenna and the transceiver, and configured to transmit the TX RF signal received from the transceiver through the antenna and deliver the RX RF signal received from the antenna to the transceiver, wherein the RF module includes a first part and a second part, the first part directly coupled with the antenna and configured to directly transmit the TX RF signal received from the transceiver through the antenna and directly receive the RX RF signal from the antenna, the second part coupled with the compensator block circuit and configured to transmit the TX RF signal received from the transceiver through the compensator block circuit and receive the RX RF signal from the compensator block circuit, wherein each of the first part and the second partthe antenna switch comprises:

a first throw providing a bypass path while the transceiver does not send any TX RF signal to the RF module or does not receive any RX RF signal from the RF module;

a second throw providing a TX path for sending the TX RF signal output by the transceiver to the antenna; and a third throw providing an RX path for sending the RX RF signal received by the antenna to the transceiver, wherein an attenuator is disposed on the bypass path and configured to satisfy a minimum output power for the C-V2X communication while the transceiver does not send any TX RF signal to the RF module or does not receive any RX RF signal from the RF module, and wherein the minimum output power for the C-V2X communication is −40 dBm or less.

6. The vehicle of claim 5, wherein the second throw is coupled to a TX amplifier.

7. The vehicle of claim 5, wherein the third throw is coupled to a low-noise amplifier (LNA).

8. The vehicle of claim 5, wherein the attenuator includes a variable resistor.

* * * * *